(12) United States Patent
Ham

(10) Patent No.: US 7,812,500 B1
(45) Date of Patent: Oct. 12, 2010

(54) GENERATOR / ELECTRIC MOTOR

(76) Inventor: Demetrius Calvin Ham, 184 S. Livingston Ave. Suite 9-#187, Livingston, NJ (US) 07039

( * ) Notice: Subject to any disclaimer, the term of this patent is extended or adjusted under 35 U.S.C. 154(b) by 104 days.

(21) Appl. No.: 12/291,608

(22) Filed: Nov. 12, 2008

(51) Int. Cl.
H02K 1/22 (2006.01)

(52) U.S. Cl. .................... 310/266; 310/268; 310/114

(58) Field of Classification Search ......... 310/112–114, 310/194, 179, 266, 268
See application file for complete search history.

(56) References Cited

U.S. PATENT DOCUMENTS

| | | |
|---|---|---|
| 396,355 A | 1/1889 | Dyer |
| 1,977,950 A | 10/1934 | Morbard |
| 1,998,142 A | 4/1935 | Meyetons |
| 4,375,047 A | 2/1983 | Nelson et al. |
| 4,517,484 A | 5/1985 | Dacier |
| 4,714,853 A | 12/1987 | Palmero et al. |
| 4,829,205 A | 5/1989 | Lindgren |
| 5,783,893 A | 7/1998 | Date et al. |
| 5,793,136 A | 8/1998 | Redzic |
| 5,796,200 A | 8/1998 | Sakashita et al. |
| 5,945,766 A * | 8/1999 | Kim et al. .................... 310/268 |
| 6,137,195 A | 10/2000 | Chitayat |
| 6,215,206 B1 | 4/2001 | Chitayat |
| 6,304,017 B1 | 10/2001 | Leupold |
| 6,380,653 B1 | 4/2002 | Seguchi |
| 6,531,799 B1 * | 3/2003 | Miller ........................ 310/114 |
| 6,727,629 B1 | 4/2004 | Soghomonian |
| 6,791,222 B1 | 9/2004 | Maslov et al. |
| 6,943,473 B2 * | 9/2005 | Furuse et al. ............... 310/112 |
| 6,992,419 B2 | 1/2006 | Kim et al. |
| 7,030,528 B2 | 4/2006 | Morgante |
| 7,164,220 B2 * | 1/2007 | Gilmour et al. ............. 310/266 |
| 7,230,363 B2 | 6/2007 | Stot et al. |
| 7,323,801 B2 * | 1/2008 | Kojima et al. ............... 310/268 |
| 7,356,906 B2 * | 4/2008 | Kim et al. ...................... 29/596 |
| 7,629,724 B2 * | 12/2009 | Tanno et al. ................. 310/268 |
| 7,667,368 B2 * | 2/2010 | Matsuzaki et al. .......... 310/268 |
| 2008/0061649 A1 * | 3/2008 | Kim et al. .............. 310/156.32 |

* cited by examiner

*Primary Examiner*—Thanh Lam
(74) *Attorney, Agent, or Firm*—Marian J. Furst

(57) ABSTRACT

A generator and/or electrical motor features elongated electromagnets which extend coaxially, not radially, about the axis of rotation of the axle, thus allowing multiple rings of magnets to be used. A chassis carries the electromagnets with the air gap surfaces of the electromagnets extending sideways, free of coils, into the air gaps with the plural rings of field magnets. Gearing arrangements may allow the ends of the can and the rings of field magnets mounted thereon to counter-rotate relative to one another. There may be four, eight or other numbers of rings of field magnets.

20 Claims, 9 Drawing Sheets

GENERATOR / ELECTRIC MOTOR

FIELD OF THE INVENTION

This invention relates generally to electrical motor devices, and specifically to vehicular generators.

STATEMENT REGARDING FEDERALLY FUNDED RESEARCH

This invention was not made under contract with an agency of the US Government, nor by any agency of the US Government.

BACKGROUND OF THE INVENTION

Generally, electrical motors and/or generators and/or alternators with unusual air gap characteristics are designed to produce devices with flattened disk shaped bodies or for other purposes.

U.S. Pat. No. 7,356,906 issued Apr. 15, 2008 to Kim et al. teaches a flattened (disk shaped) device which is otherwise a fairly conventional "inner-outer" air-gaps and stator ends type of generator and/or motor. The multiple air gap aspect of it is the inner and outer pair of air gaps: there are no multiple layers of coaxial magnets. Similar items include U.S. Pat. No. 6,992,419 to the same inventor on Jan. 31, 2006, U.S. Pat. No. 4,517,484 to Dacier on May 14, 1985; U.S. Pat. No. 4,714,853 to Palmero et al on Dec. 22, 1987; U.S. Pat. No. 4,829,205 to Lindgren on May 9, 1989; U.S. Pat. No. 7,230,363 to Stout et al on Jun. 12, 2007; U.S. Pat. No. 396,355 issued Jan. 15, 1889 to Dyer; U.S. Pat. No. 1,977,950 issued Oct. 23, 1934 to Morhard; U.S. Pat. No. 6,137,195 issued Oct. 24, 2000 to Chitayat; and U.S. Pat. No. 1,998,142 to Meyertons on Apr. 16, 1935 and even U.S. Pat. No. 5,793,136 issued Aug. 11, 1998 to Redzic for a more elongated design. Note that such designs go back at least as far as the 1930's.

U.S. Pat. No. 6,380,653 to Seguchi on Apr. 30, 2002, teaches an interesting "two rotor" design, however, it does not show elongated electromagnets with multiple projecting air gap surfaces which project from the ends of the electromagnetic rotors.

U.S. Pat. No. 6,727,629 to Soghomonian et al on Apr. 27, 2004 teaches a design with a view which shows two rings of small flat magnets, however, closer inspection reveals that this is another conventional two air gap design with rotors and stators in conventional position entirely between one another and lacking double ended electromagnets with projecting surfaces.

U.S. Pat. No. 6,791,222 issued Sep. 14, 2004 to Maslov et al teaches a design in which air gaps are used about the radius of the stator, but which is structurally dissimilar to the present invention. In particular, there is no indication in the Maslov patent of electromagnets oriented parallel to (coaxial to) the axis of rotation of the generator.

Other types of machines with rotors entirely disposed between permanent magnets include U.S. Pat. No. 5,783,893 to Date et al on Jul. 21, 1998, U.S. Pat. No. 7,030,528 issued Apr. 18, 2006 to Morgante; U.S. Pat. No. 6,304,017 issued Oct. 16, 2001 to Leupold; U.S. Pat. No. 5,796,200 to Sakashita et al on Aug. 18, 1998; U.S. Pat. No. 4,375,047 issued Feb. 22, 1983 to Nelson et al; and U.S. Pat. No. 6,215,206 issued Apr. 10, 2001 to Chitayat.

None of these devices teach that a great plurality of air gaps may be generated by reorienting electromagnets parallel to the axis, thus reorienting the field magnets and air gaps therebetween.

It would be preferable to provide an electromechanical device with multiple or even a multiplicity, of air gaps, rings of field magnets and electromagnets.

It would further be preferable to provide a generator type device with electromagnets oriented coaxial (parallel to the axle of) the electromagnet chassis.

It would yet further be preferable to provide a generator type device offering counter-rotation of the field magnets to the electromagnets of the electromagnet chassis.

It would yet further be preferable to provide a generator type device offering projections in the axial direction from the ends of the electromagnet chassis electromagnets, projections beyond the ends of the coils, which projections create the electromagnets' air gap surfaces.

It would yet further be preferable to provide electromechanical type devices which offer unique characteristics in terms of RPM, power, voltage, and the like.

SUMMARY OF THE INVENTION

General Summary

The present invention teaches a generator and/or electrical motor which features elongated electromagnets which extend coaxially, not radially, about the axis of rotation of the axle, thus allowing multiple rings of magnets to be used and multiple air gaps to be generated. A chassis carries the electromagnets with the air gap surfaces of the electromagnets extending sideways, free of the electromagnet coils, into the air gaps with the plural rings of field magnets. Thus the air gaps are arranged generally parallel to the axis of rotation and the air gaps can be multiplied up and down the width of the electromagnet chassis, to make as many air gaps as desired. There may be four, eight or other numbers of rings of field magnets, they need not be symmetrical with the field magnets on the other side of the electromagnet chassis, and there are many possible arrangement of the electromagnets on the electromagnet chassis and the field magnets on the body/flux ring/"can" of the device may be extremely flexible.

Gearing arrangements may allow the two ends of the body of the device, which is normally the can-like outer shell (but in embodiments may not be) to carry the field magnets in counter-rotation to each other.

SUMMARY IN REFERENCE TO CLAIMS

It is therefore another aspect, advantage, objective and embodiment of the invention, in addition to those discussed previously, to provide an electrical generator and/or motor comprising:

a can;

an axle extending into the can, the axle defining axial and radial dimensions of the device, the axle having thereon an electromagnet chassis extending from a medial portion of the axle in the radial direction, the chassis not rotating with the axle;

a plurality of electromagnets attached to the electromagnet chassis, each electromagnet having an elongated can disposed parallel to the axle, each electromagnet body having one or two ends extending from the electromagnet chassis, the ends extending axially and in opposite directions from the chassis;

each electromagnet having a winding portion and at least one winding disposed about the electromagnet body winding portion of the electromagnet;

each electromagnet further having at least one projection portion having at least one air gap surface projecting axially out beyond each end of the electromagnet body;

a plurality of rings of magnets disposed in electromagnetic communication with each air gap surface, the first type of ring of magnets disposed radially outward from the projection portion of the electromagnet and the second type of ring of magnets disposed radially inward from the projection portion of the electromagnet;

each of the rings of magnets further disposed axially from the winding portion of each electromagnet.

It is therefore another aspect, advantage, objective and embodiment of the invention to provide an electrical generator and/or motor wherein:

each electromagnet has two projections at each end; and the device has four rings of magnets.

It is therefore another aspect, advantage, objective and embodiment of the invention to provide an electrical generator and/or motor wherein:

each electromagnet has four projections at each end; and the device has eight rings of magnets.

It is therefore another aspect, advantage, objective and embodiment of the invention to provide an electrical generator and/or motor further comprising:

first and second parts of the can disposed about the axle facing and opposed, each having a facing interior side, each facing interior side having at least one ring of magnets attached thereto.

It is therefore another aspect, advantage, objective and embodiment of the invention to provide an electrical generator and/or motor wherein: the windings are disposed upon the winding portions of the electromagnet bodies with the windings partially located in between the projections, in a plane substantially parallel to the axis, for example as in FIG. 10.

It is therefore another aspect, advantage, objective and embodiment of the invention to provide an electrical generator and/or motor wherein: the windings are disposed upon the winding portions of the electromagnet bodies with the windings co-axial with the axis, for example as in FIG. 9.

It is therefore another aspect, advantage, objective and embodiment of the invention to provide an electrical generator and/or motor further comprising: means for allowing counter-rotation of the two can parts.

It is therefore another aspect, advantage, objective and embodiment of the invention to provide an electrical generator and/or motor wherein: the means for allowing counter-rotation of the two can parts further comprises:

bearings disposed upon the axle and at least one of the two can parts. It is therefore another aspect, advantage, objective and embodiment of the invention to provide an electrical generator and/or motor wherein: the means for allowing counter-rotation of the two can parts further comprises:

a first can part disposed about the axle but not directly attached thereto, and gearing causing the first can part to counter-rotate in relationship to the second can part.

It is therefore another aspect, advantage, objective and embodiment of the invention to provide an electrical generator and/or motor wherein:

there are at least three electromagnets.

It is therefore another aspect, advantage, objective and embodiment of the invention to provide an electrical generator and/or motor comprising:

an axle, having disposed thereon an electromagnet chassis having disposed thereon a plurality of elongated electromagnets, the chassis and can not co-rotating, the electromagnets having one or two ends extending axially from the electromagnet chassis in opposite directions, each end having at least one projection extending further axially and free of windings into an air gap defined by at least two rings of field magnets at each end of the electromagnets.

It is therefore another aspect, advantage, objective and embodiment of the invention to provide an electrical generator and/or motor wherein:

each electromagnet has two projections at each end; and the device has four rings of field magnets.

It is therefore another aspect, advantage, objective and embodiment of the invention to provide an electrical generator and/or motor wherein:

each electromagnet has four projections at each end; and the device has eight rings of field magnets.

It is therefore another aspect, advantage, objective and embodiment of the invention to provide an electrical generator and/or motor further comprising:

a can having first and second parts of the can disposed about the axle facing and opposed, each having a facing interior side, each facing interior side having at least one ring of field magnets attached thereto.

It is therefore another aspect, advantage, objective and embodiment of the invention to provide an electrical generator and/or motor wherein: electromagnet windings are disposed upon the electromagnets with the windings partially located in between the projections, in a plane substantially parallel to the axis.

It is therefore another aspect, advantage, objective and embodiment of the invention to provide an electrical generator and/or motor wherein: electromagnet windings are disposed upon the electromagnets with the windings co-axial with the axis.

It is therefore another aspect, advantage, objective and embodiment of the invention to provide an electrical generator and/or motor further comprising means for allowing counter-rotation of the two can parts.

It is therefore another aspect, advantage, objective and embodiment of the invention to provide an electrical generator and/or motor wherein: the means for allowing counter-rotation of the two can parts further comprises:

bearings disposed upon the axle and at least one of the two can parts;

a first can part disposed about the axle but not directly attached thereto; and gearing causing the first can part to counter-rotate in relationship to the second can part.

It is therefore another aspect, advantage, objective and embodiment of the invention to provide an electrical generator and/or motor wherein:

there are at least three electromagnets.

It is therefore another aspect, advantage, objective and embodiment of the invention to provide an electrical generator and/or motor wherein:

the motion of the parts of the device is one member selected from the group consisting of:

the can rotating and the electromagnet chassis not rotating, the can not rotating and the electromagnet chassis rotating, and the can and electromagnet chassis counter-rotating.

Figure 1:
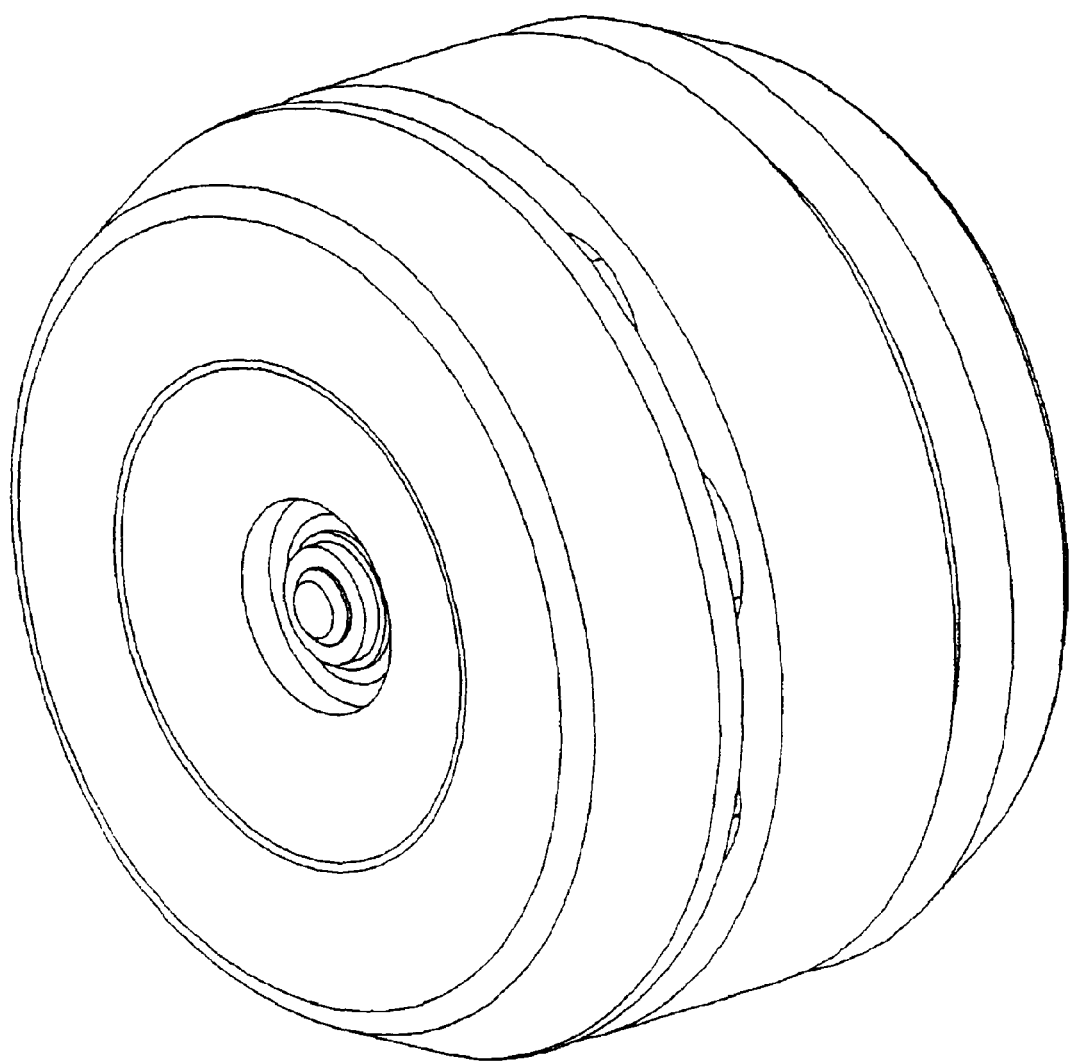
FIG. 1 is a perspective view of a first embodiment of the invention.

| INDEX TO REFERENCE NUMERALS | |
|---|---|
| Device | 100 |
| First can/body/flux ring part | 102 |
| First end magnet rings | 104 |
| Electromagnet retainer | 106 |
| Electromagnet/body portion | 108 |
| Chassis | 110 |
| Bearing | 112 |
| Bevel gear | 114 |
| Gear pin | 116 |
| Spacer/bearing | 118 |
| Shaft | 120 |
| Second end magnet rings | 122 |
| Second can part | 124 |
| Bearing | 126 |
| Shaft nut | 128 |
| Electromagnet coil | 130 |
| First air gap surface | 132 |
| Second air gap surface | 134 |
| Third air gap surface | 136 |

| -continued | |
|---|---|
| INDEX TO REFERENCE NUMERALS | |
| Body gear | 137 |
| Fourth air gap surface | 138 |
| First can/flux ring/body part | 202 |
| First end magnet rings | 204 |
| Electromagnet | 208 |
| Chassis | 210 |
| Spacer/bearing | 218 |
| Shaft | 220 |
| Second end magnet rings | 222 |
| Second can/flux ring/body part | 224 |
| Bearing | 226 |
| Shaft nut | 228 |
| Electromagnet coil | 230 |
| First air gap surface | 232 |
| Second air gap surface | 234 |
| End | 236 |
| Projection | 238 |
| First magnet ring | 304 |
| Electromagnet | 308 |
| Second magnet ring | 322 |
| Counter-rotation gear | 338 |
| Second shaft portion | 340 |
| Chassis portion | 342 |
| Shaft and gear assembly | 344 |
| First can portion | 346 |
| Second can portion | 348 |
| Shaft mounted inner field magnet ring | 350 |
| Body cover | 352 |
| Ratio gear | 354 |
| Shaft bearing | 356 |
| Bearing | 358 |
| Shaft gear | 360 |
| Body gear | 362 |
| Field magnet mounting | 364 |
| Shaft mounted inner field magnet ring | 366 |

DETAILED DESCRIPTION

An examination of prior art armatures may be useful. Prior art armatures/stators look like "wagon wheels" (and are sometimes called that, just as bodies of generators and/or motors are sometimes called "cans"), with windings around each spoke of the wagon wheel. Occasionally, prior art designs have shown armatures which are elongated in the radial direction and flattened in the axial direction, resulting in an overall "movie reel can" shaped motor rather than the usual "can shaped" motor. As mentioned previously, U.S. Pat. No. 7,356,906 teaches one such flattened (disk shaped) device, however, this device is otherwise a fairly conventional "inner-outer" air-gap and stator end type of generator and/or motor. The only multiple air gap aspect of it is the pair of air gaps: there are no multiple layers of electromagnets. Other similar devices located in search are listed with the discussion of the '906 patent. In these devices, the wheel is itself magnetically part of the electromagnets it carries.

The present invention on the other hand teaches that a traditional armature may be replaced with a new, novel ferrous or non-ferrous "electromagnet chassis" which may have multiple (magnetically separated) electromagnets extending outward parallel to the axis of rotation of the electromagnet chassis, with the end or ends of each of the electromagnets projecting into the air gaps which are actually disposed, with the field magnets, beside the electromagnet chassis on either side. The ends of the electromagnets may have projections which extend beyond the coils of the electromagnets and carrying one or more air gap surfaces so as to make numerous smaller air gaps, and by proliferation of the electromagnets and their air gap surfaces and the field magnets opposing them, an enormous number of magnetic interactions may be generated. The chassis itself, unlike a traditional armature, holds the electromagnets but is not part of the electromagnets. Furthermore, the chassis may be split up into two halves.

FIG. 1 is a perspective view of a first embodiment of the invention. Body 100 is a fairly normal ratio of axial length to radial width, that is, unlike the prior art, which attempts to create "flattened" or disk shaped generators or electrical motors, the present invention may allow a wide range of shapes but is generally directed toward an important internal difference: groups of air gaps or electromagnets oriented at 90 degrees to the conventional direction, that is, air gaps and electromagnets which are coaxial rather than radial to the axis of the device.

Figure 2:
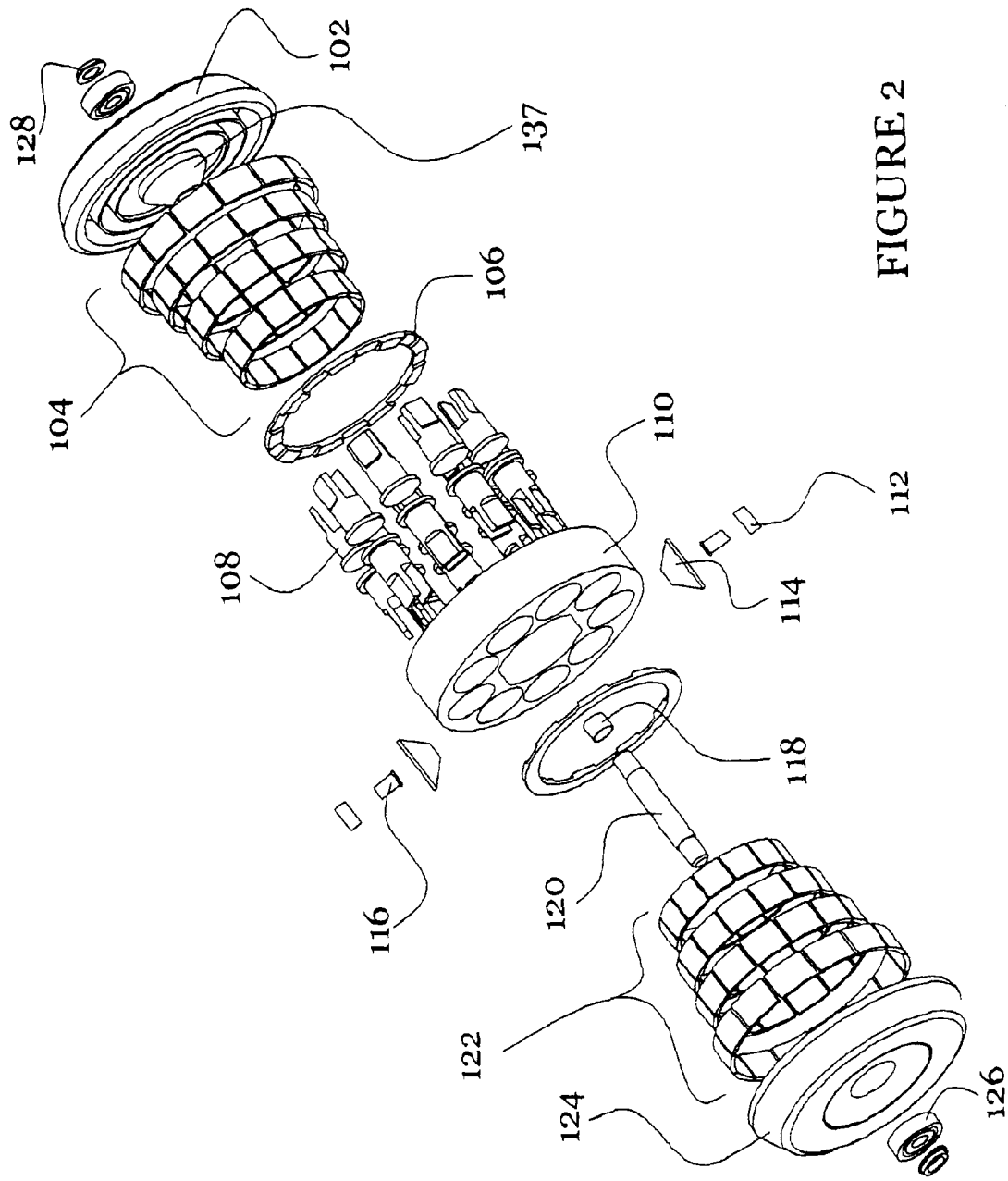
FIG. 2 is an exploded view of the first embodiment of the invention showing internal details such as the characteristic orientation and double-ended nature of the electromagnets.
Figure 3:
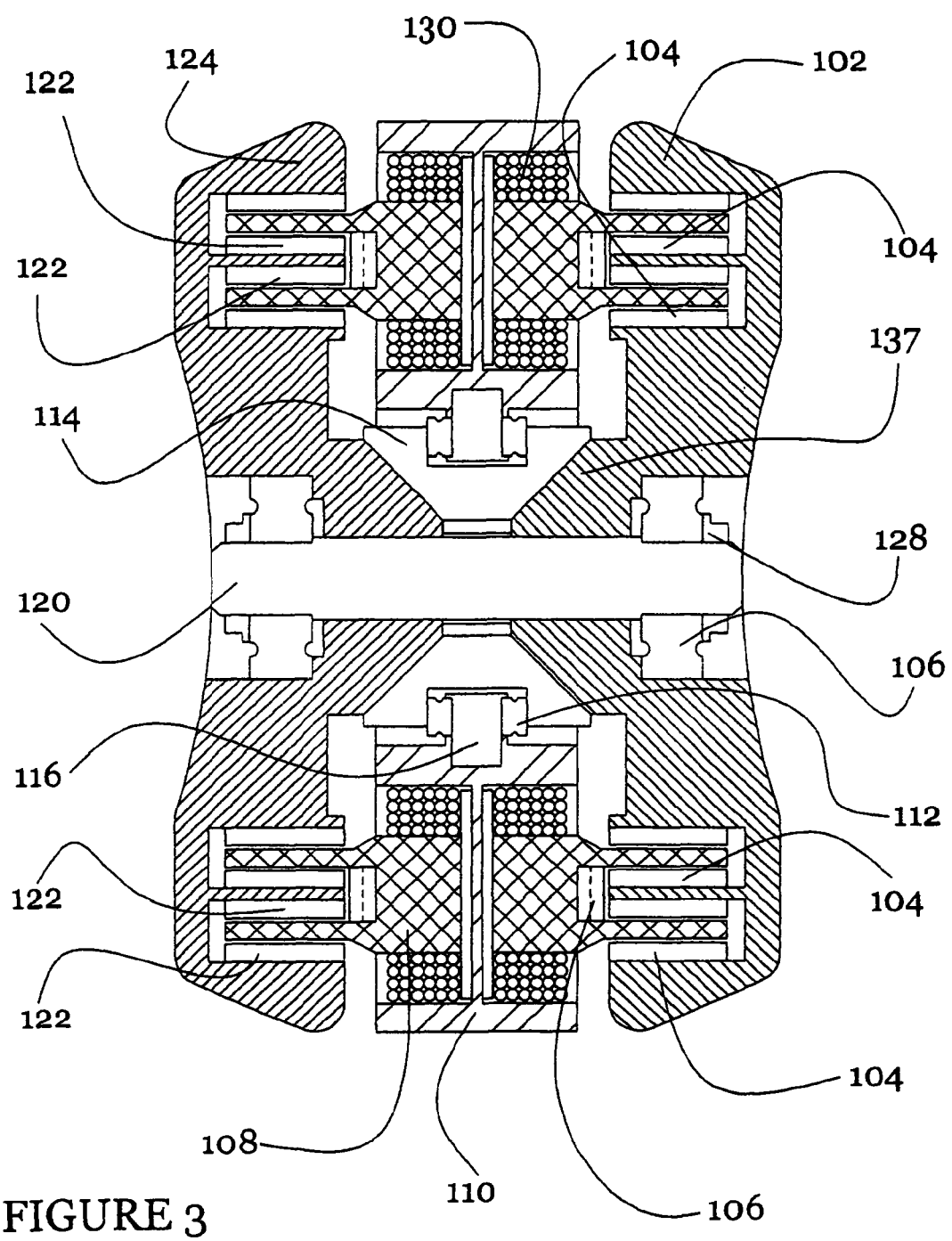
FIG. 3 is a cross-sectional view of the first embodiment of the invention showing internal details, in particular the arrangement of the air gaps and "single-active-end" electromagnets and the two electromagnet chassis halves and the two counter rotating cans.

FIG. 2 is an exploded view of the first embodiment of the invention showing internal details such as the characteristic orientation and double-ended nature of the electromagnets, while FIG. 3 is a cross-sectional view of the first embodiment of the invention showing additional internal features. First can part 102 and second can part 124, along with the outer periphery of chassis 110, form the majority of the exterior surface of the motor and/or generator 100 seen in FIG. 1. The stationary chassis 110 forms the mounting point for the device, not the spinning can parts 102 and 124. This electromagnet chassis may be non-ferrous, that is, made of a material such as aluminum or polymer or the like, so as to magnetically isolate each elongated electromagnet it carries from the next. It can alternatively be of a ferrous material such as steel or the like.

In the presently preferred embodiment and best mode presently contemplated for carrying out the invention, first end magnet rings 104 are in turn attached to first body part 102 in a series of circular rings, four in this case, which project toward the middle section of the device. At the other end of the device, distal the first body part 102, is second body part 124 with another series of magnet rings 122. While the two ends of the device are seen to be symmetrical in this case, in alternative embodiments, they need not be. Either end could be larger, smaller, have different arrangements, numbers and sizes of field magnets, body parts, electromagnet projections, rings and so on.

Electromagnet retainer 106 holds electromagnet 108 onto the electromagnet chassis 110. A wide variety of retaining mechanisms other than the ring shaped retainer 106 may be used.

Electromagnet 108 may be seen to have several interesting features. Firstly, the electromagnet is not disposed at nor around the axle 120 radially, nor is the individual electromagnet directly mechanically or magnetically linked to other electromagnets by the chassis. Secondly, it is elongated and thirdly, it is elongated in the "coaxial" direction, meaning, parallel to the axle 120. While the electromagnet 108 may have windings disposed about it (seen in later Figures, but the windings are omitted from this FIG. 2 for clarity), it may further be seen that the ends of the elongated electromagnet project significantly beyond the coil portion. And as a fifth point, the projections form on each end of each electromagnet a plurality of air gap surfaces. In the embodiment diagramed in FIG. 2, each electromagnet has two ends, each end has two projections, and each projection has two air gap surfaces, for a total of eight air gap surfaces to each elongated electromagnet. Note that the number of surfaces per projection can be reduced to one, or the number of projections can be reduced to one on each end or increased, the electromagnets can have only a single end with projections (as shown in FIG. 4A), or multiple rings of electromagnets may be used. The shape, size and arrangement of the electromagnets may also vary, or the electromagnets may move while the field magnets sit still in alternative embodiments in a manner similar to a brushed motor, and so on. However, the unique feature of the invention (the double ended electromagnets parallel to the axle, with the permanent magnets in rings "beside" the projecting ends) is preserved. For example the embodiment shown, which has a total of eight air gap surfaces and eight rings of permanent magnets, is only one possible embodiment, other embodiments also fall within the scope of the appended claims.

The eight magnet rings 104 and 122 are depicted as having therein a plurality of smaller permanent magnets, however, the invention is not so limited. Electromagnets may be used, windings arranged so that each ring has a larger or smaller number of field magnets (including even a single annular (ring shaped) field magnet of electrical or permanent type), and so on.

Bearing 112 allows rotation of bevel gear 114 on gear pin 116 which is in turn connected to the electromagnet chassis 110, with bevel gear 114 in mechanically operative engagement to can gear 137 of the can. As a result, the rotation of the can-like body 102/124 does not cause rotation of chassis 110 and the electromagnets thereon, thus providing the relative rotation necessary for an electromechanical device such as a generator and/or electrical motor to function.

Spacer/bearing 118 seated on shaft 120 prevents the bevel gears, shaft or body from contacting each other in undesirable ways, serving to keep them aligned and in their proper positions. It may be seen that the combination of two bevel gears 114 and the body gears 137 allow the different body parts 102 and 124 to rotate in opposite directions from one another, with the elongated electromagnets in between sitting still. Since the bevel gears 114 are mounted on the bearings 112, the motion of the bevel gears, shaft and body parts does not cause rotation of the chassis.

Bearing 126 allows rotation of the can in relation to the electromagnet chassis at the point at which the shaft 120 penetrates the body's can-like shell, while shaft nut 128 holds the assembly together on the shaft 120.

In FIG. 3, the coils may be seen to be orthogonal to the plane of the diagram and thus shown as a series of circles. However, the coils may be arranged in several ways. In particular, the arrangement of the windings determines the polar axis of the magnetic field generated by the stationary electromagnet chassis electromagnets, and the polar orientation of the magnetic field must be correct in reference to the polar orientation of the field magnets and the relative direction of rotation of the field magnets on the cans to the electromagnets on the chassis.

In FIG. 3, it may be seen that two electromagnets are employed back to back, "single-active-end" electromagnets (with windings which run in opposite directions as will be discussed later in relation to FIG. 4A) with the result that both ends of a back to back pair of electromagnets will have the same polarity. Note further that the gear 114 engaged to gear 137 will cause counter-rotation of the two different body/can portions (102 versus 124) in two opposite directions of rotation.

Figure 4:
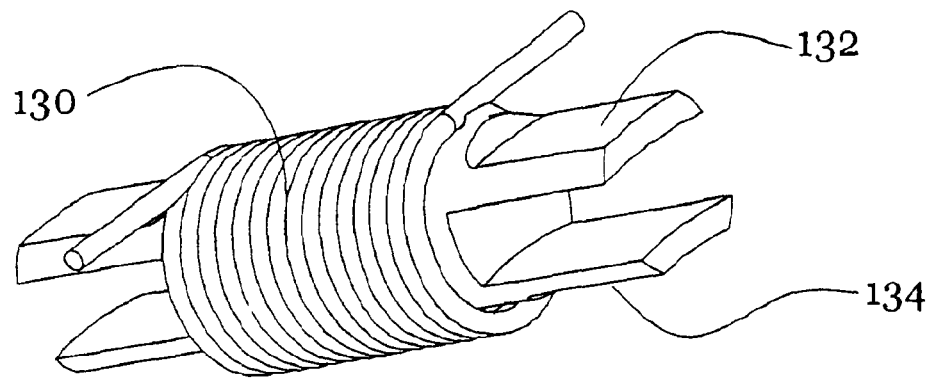
FIG. 4 is a perspective view of a single electromagnet of an alternative embodiment of the invention, with coils shown running a first direction.
Figure 4A:
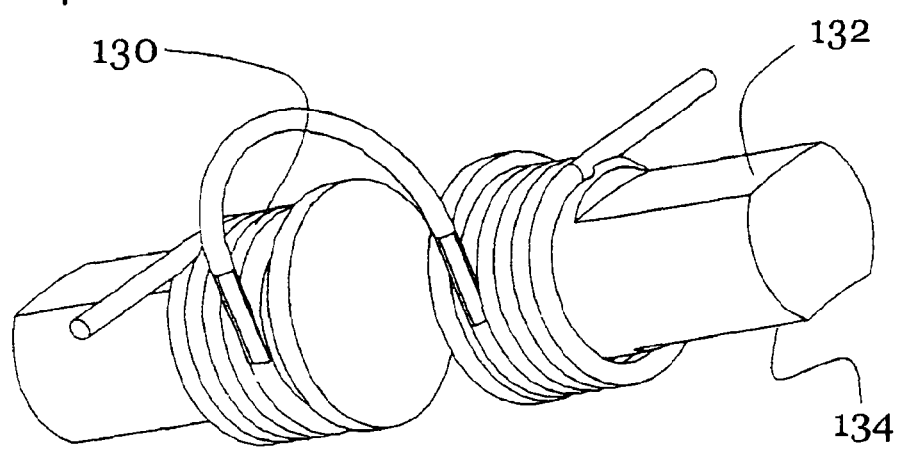
FIG. 4A is a perspective view of TWO electromagnets of the first embodiment of the invention, with coils shown running a first direction on one electromagnet and a second direction on the other, the two electromagnets strongly resembling a single electromagnet in appearance. Only one end of the electromagnet is active for generator and/or motor use, however, both ends of the combined two electromagnet pair are active.
Figure 5:
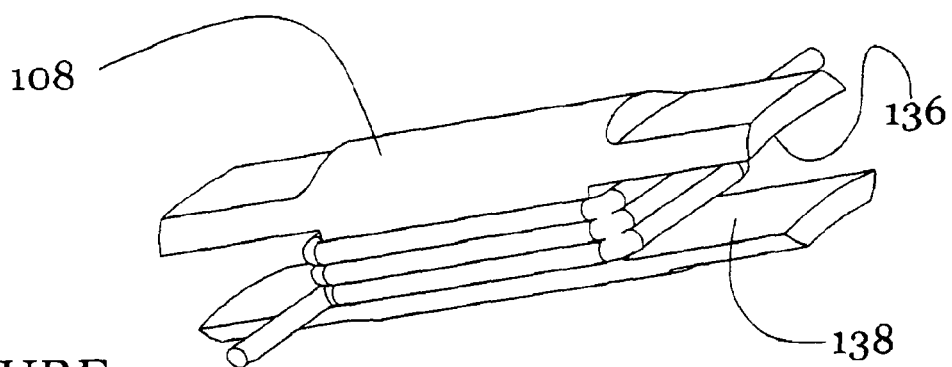
FIG. 5 is a perspective view of a single electromagnet of an alternative embodiment of the invention, with coils shown running in a different direction.

FIG. 4 is a perspective view of a single electromagnet of an alternative embodiment of the invention, with coils shown running a first direction, and FIG. 5 is a perspective view of a single electromagnet of an alternative embodiment of the invention, with coils shown running in a different direction. The differing directions alter by 90 degrees the polar axis of the magnetic field.

Electromagnet coil 130 is seen in FIG. 4 to be wound around the body portion of the electromagnet in a shape conforming to the cross-section of the electromagnet, which is depicted to be round, leading to round coils 130. (Note that the cross-section of the electromagnet 108 may of course be any shape.) However, in FIG. 5 the coils are depicted to run along the length of the electromagnet, seating at the ends in the channels created between the end projections, which are clearly shown in both FIG. 4 and FIG. 5 as being projections of the electromagnet beyond the coils and coil portion of the electromagnet. In the first arrangement, the polar axis of electromagnetism will be along the axis of the magnet body, while in the second arrangement the polar axis will be perpendicular to the electromagnet's elongated body.

FIG. 4A, however, does not show one electromagnet but rather shows TWO electromagnets back to back, as seen previously in FIG. 3. FIG. 4A shows two electromagnets back to back within a single winding. The winding actually reverses direction at the "U" bend shown (which is where the winding crosses from one electromagnet to the other). This reverse allows the polarity of the projection on one electromagnet to be the same as the polarity on the projection on the other electromagnet. Since the two electromagnets back-to-back appear to be a single electromagnet, the effect is almost like having an electromagnet which has the same polarity at both ends, something which is normally considered impossible. Only one end of the individual electromagnet is active for generator and/or motor use, however, both ends of the combined two electromagnet pair are active.

These projections are also very important, regardless of polarity. By means of these projections a plurality of air gap surfaces may be created. In alternative embodiments very small coils might extend up the projections, or a larger body coil and small projection coil might be used and so on. However, in the presently preferred embodiments, the projections extend from the ends of the electromagnet body, project clear of the coils, and, then have at least one air gap surface on each projection. The projections shown in FIG. 4 in fact have two air gap surfaces each, thus allowing four air gap surfaces per end of each electromagnet. An electromagnet with more projections could in fact have even more air gap surfaces, or there can be only one air gap surface per projection or only one projection per end and so on.

First air gap surface 132 and second air gap surface 134 are on opposite sides, while third air gap surface 136 and fourth air gap surface 138 face each other across a space or channel. It is useful to pause and visualize the channel between air gap surfaces 136 and 138 having therein a pair of rings of field magnets and support structures, or else to briefly refer back to cross-sectional FIG. 3 and see how the projections have between them rings of magnets numbered 122 and 104, along with a small bit of support structure which is part of body/can parts 102/124.

It may be seen that the air gap surfaces 132, 134, 136 and 138 need not be quite straight. In fact, a more effective (smaller and more uniform) air gap is created by giving the field magnet rings (104, 122, etc) and the air gap surfaces (132, 138, etc) a slight curvature corresponding to the curvature of the overall ring of field magnets. This curvature is seen in FIGS. 4, 4A, 5, 8, 9 and 10. This reduction in the air gap in turn provides that the operative magnetic engagement between the field magnets and the electromagnets is stronger.

Figure 6:
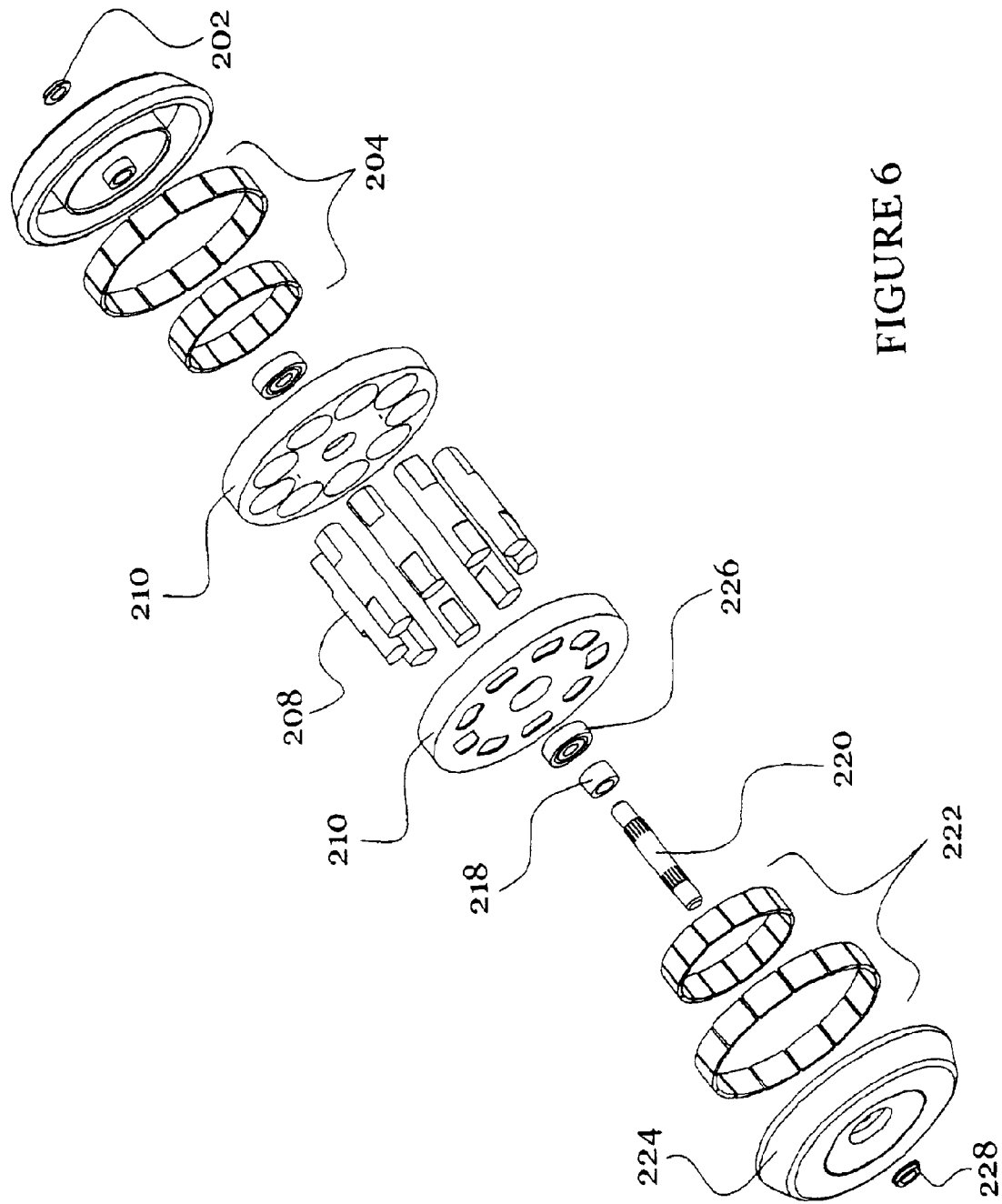
FIG. 6 is an exploded view of a second embodiment of the invention, showing a reduced number of air gaps but the characteristic orientation of the double-ended electromagnets.
Figure 7:
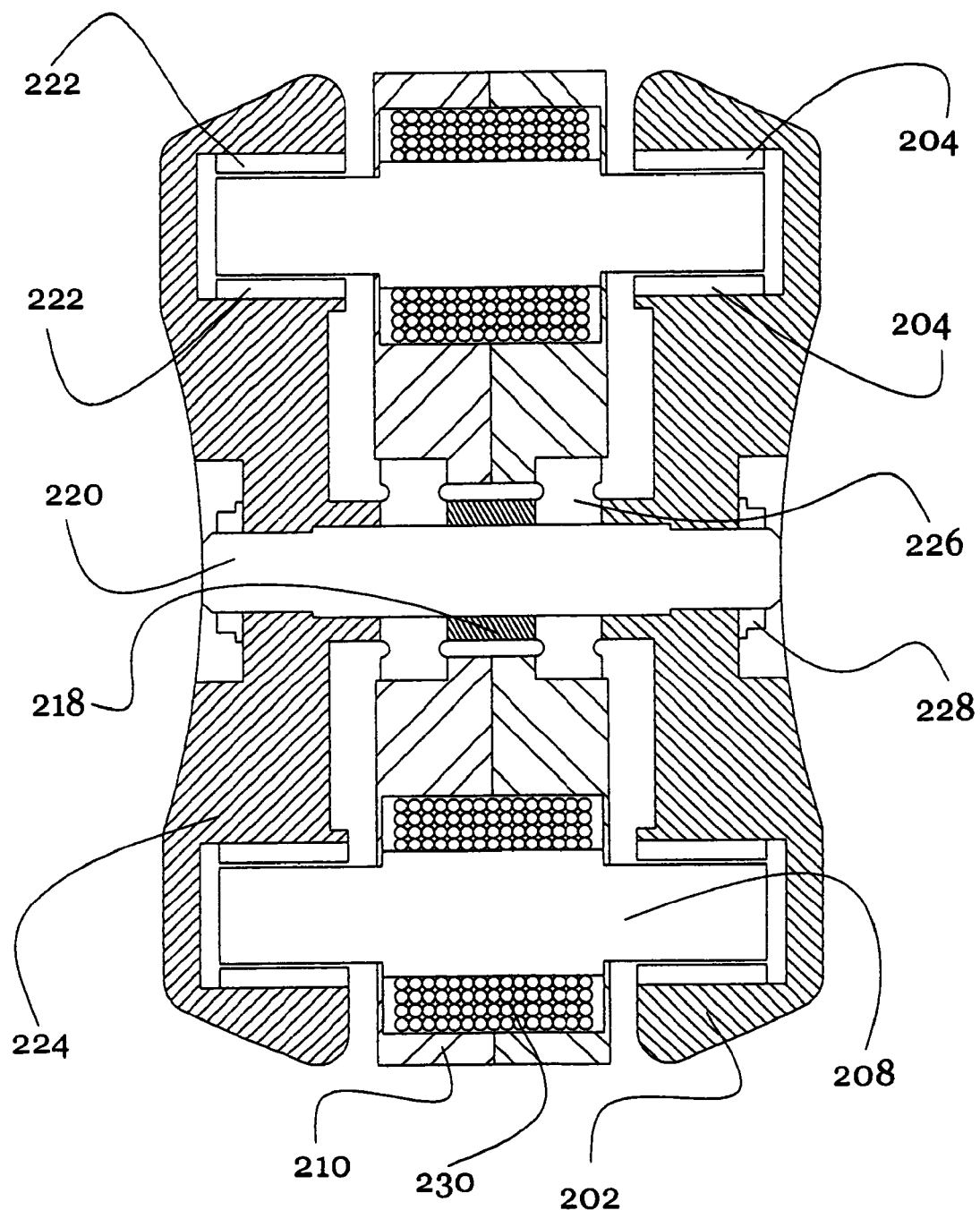
FIG. 7 is a cross sectional view of the second embodiment of the invention, showing the double-ended electromagnets with the cans spinning the same direction on both sides.

FIG. 6 is an exploded view of a second embodiment of the invention, showing a reduced number of air gaps but the characteristic orientation of the double-ended electromagnets, while FIG. 7 is a cross sectional view of the second embodiment of the invention, again showing the orientation of the double-ended electromagnets in an embodiment in which both cans rotate in the same direction. While there are only a mere four air gaps and four rings of field magnets, the embodiments is still unique over all known prior art due to the arrangement of the elongated electromagnets on the chassis 210, which holds the electromagnets 208 parallel (coaxial) to the axle 220. As in the first embodiment, the outer periphery of the chassis 210 is the useful mounting point for the device. Unlike the first embodiment, the cans co-rotate.

First can part 202 has first end magnet rings 204. Chassis 210 holds a number of electromagnets 208 in place. It may be seen that the number of electromagnets may be varied from a very small number up to a very large number. The shape, size and spacing of the electromagnets 208 may be varied so that they may form a substantially continuous ring if necessary, with little or no gapping in between the air gap spaces of adjoining electromagnets, or they may be spaced apart if desired.

Spacer/bearing 218 and bearing 226 as well as nut 228 once again serve the function of keeping the chassis, axle and can aligned so that no contact between the electromagnets and field magnets occurs, nor does any contact between spinning portions such as the can parts and parts spinning therewith and the electromagnet chassis and parts stationary therewith.

Second end magnet rings 222 are also supported by second can part 224: internal details may be much the same as those seen in the interior of first can part 202. It will be noticed that the bevel gears and body gears are not used in this embodiment, that is, the cans and field magnets are simply fixed in a single direction of rotation, without counter-rotation, while the electromagnet chassis electromagnets 208 and chassis 210 are stationary within. As noted previously, the electromagnet chassis (chassis and electromagnets) may in embodiments spin, though the preferred embodiments have the cans spinning and the chassis sitting still.

Figure 8:
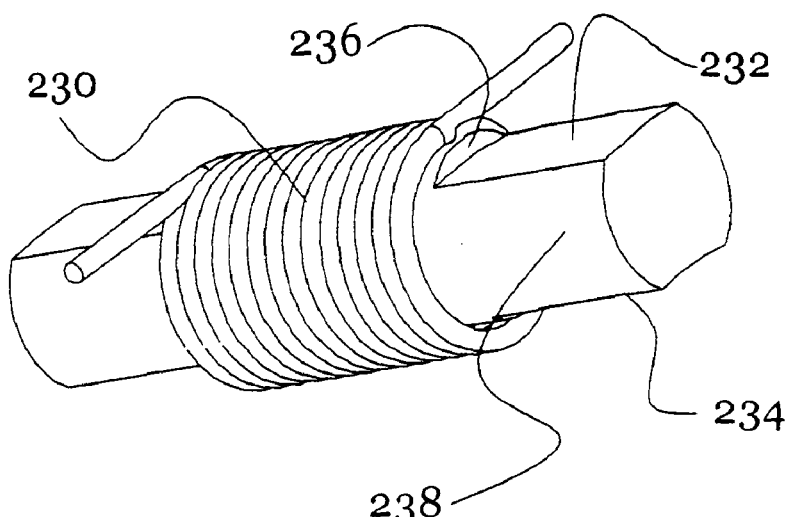
FIG. 8 is a perspective view of a single electromagnet of the second embodiment of the invention in which the projection passes between the field magnets.

Electromagnet coil 230 (seen in FIG. 7 but omitted from FIG. 6 for clarity) is shown with the windings of the coil about the "axis" of the electromagnets, as is shown in FIG. 8. FIG. 8 is a perspective view of a single electromagnet with single projections at each end 236 of the second embodiment of the invention. Since there is only a single projection 238 at each end, there only two air gap surfaces, first air gap surface 232 and second air gap surface 234, located on outer faces of the projection 238.

Figure 9:
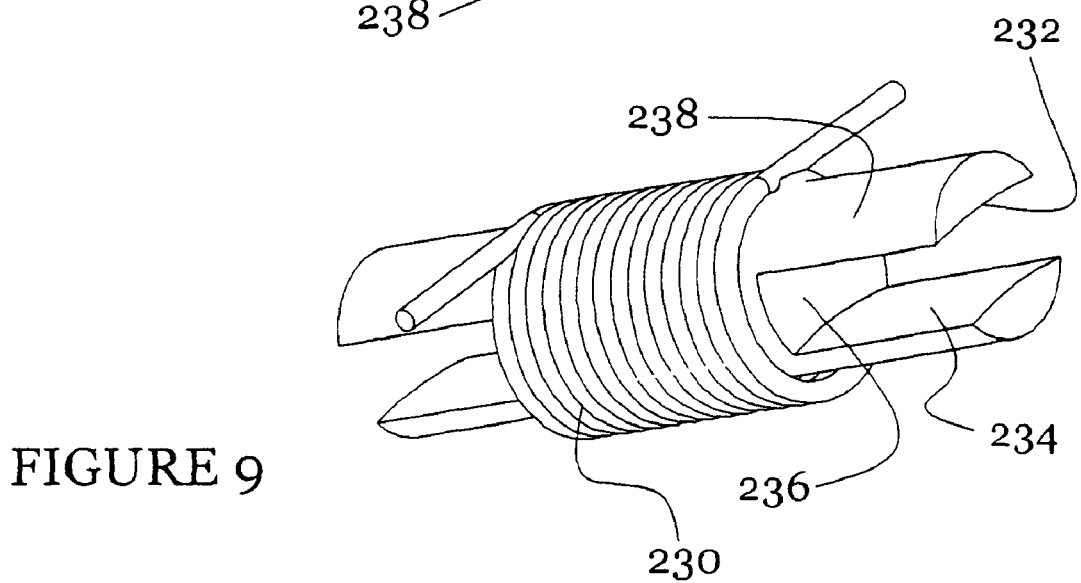
FIG. 9 is a perspective view of a single electromagnet of an alternative embodiment of the invention in which the field magnets pass between the projections.
Figure 10:
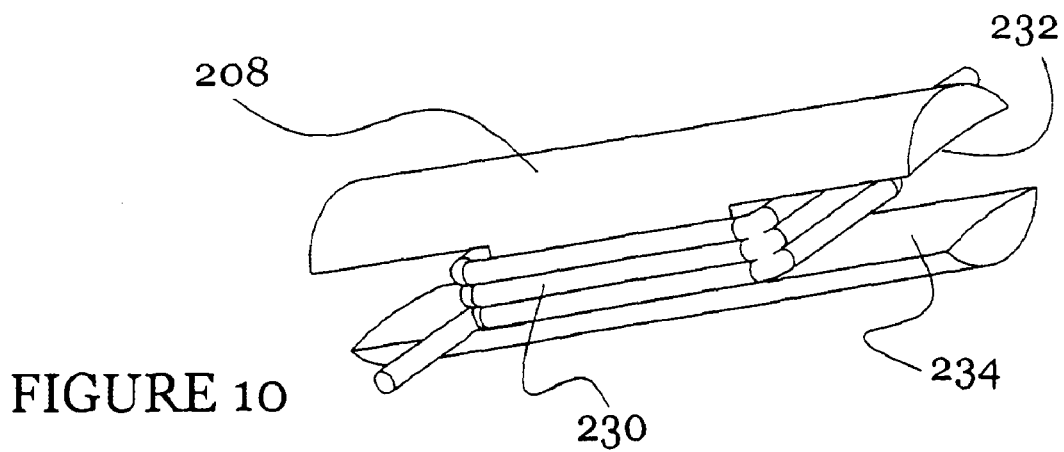
FIG. 10 is a perspective view of a single electromagnet of an alternative embodiment of the invention in which both the field magnets and portions of the electromagnet windings pass between the projections.

In the embodiment of FIG. 8, the field magnets will be on both sides of the projections, while in the embodiments of FIGS. 9 and 10, the field magnets will pass between the projections.

FIG. 9 is a perspective view of a single electromagnet of an alternative embodiment of the invention. In this embodiment, there are two projections 238 at end 236 but with single air gap surfaces on each, so this electromagnet may be used in a manner similar to that of FIG. 8, with the important difference that the two rings of field magnets will be disposed within the channel between the air gap projections rather than with the electromagnet between the rings of field magnets.

FIG. 10 is a perspective view of a single electromagnet of an alternative embodiment of the invention, again a type with two single air gap surface projections facing each other across a channel, but in this case, the windings are depicted running along the length of the coil portion of the magnet, thus turning the polar axis of magnetism by 90 degrees and thus in turn impacting magnetic interactions of the field magnets and electromagnets. The relative sizes of windings, their numbers and so on are of course exemplary, for example, the scale of the windings is exaggerated for clarity, winding patterns are simplified for clarity and so on. Both the field magnets and portions of the electromagnet windings pass between the projections.

Figure 11:
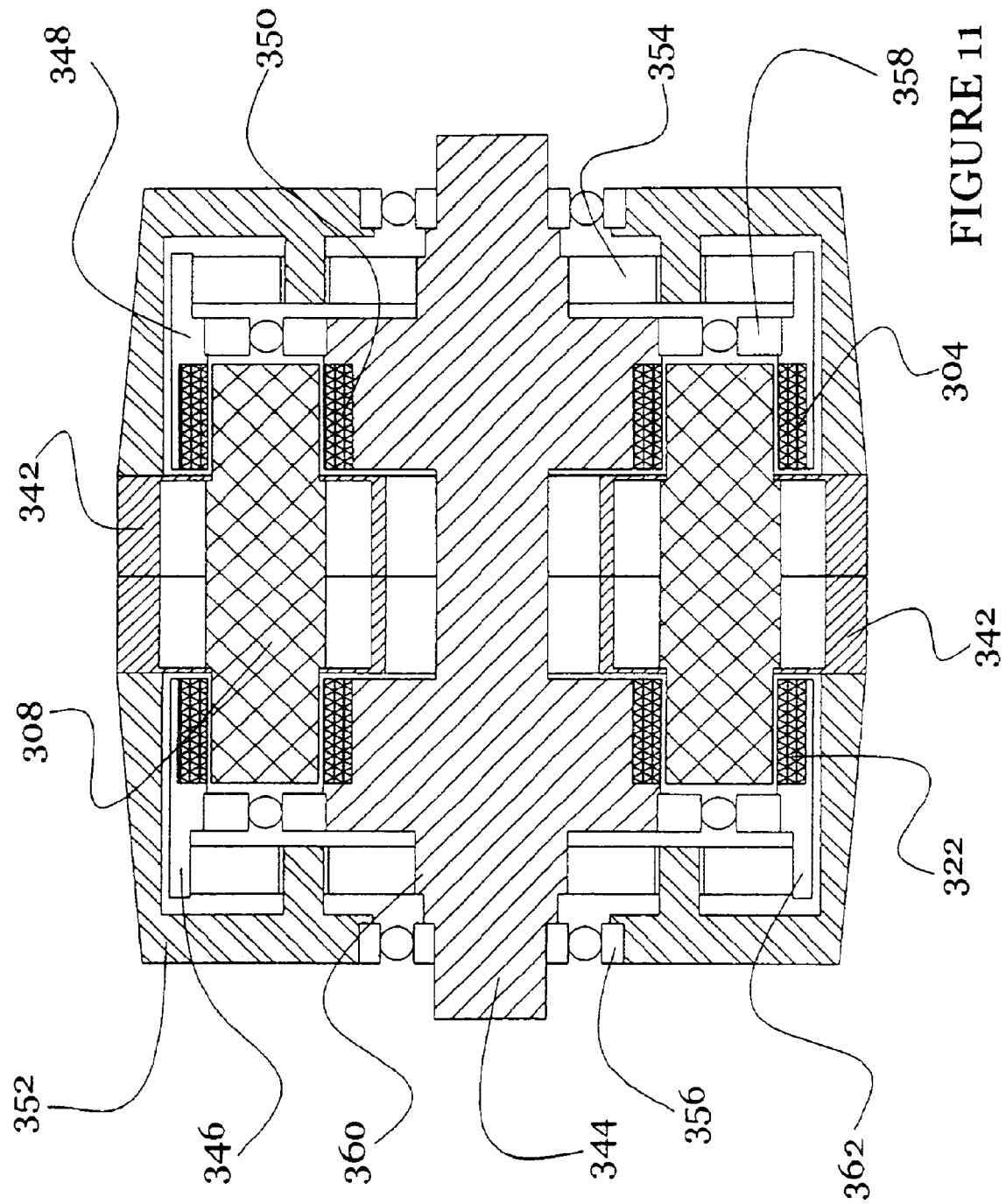
FIG. 11 is a cross sectional view of a third embodiment of the invention.
Figures 12, 12A:
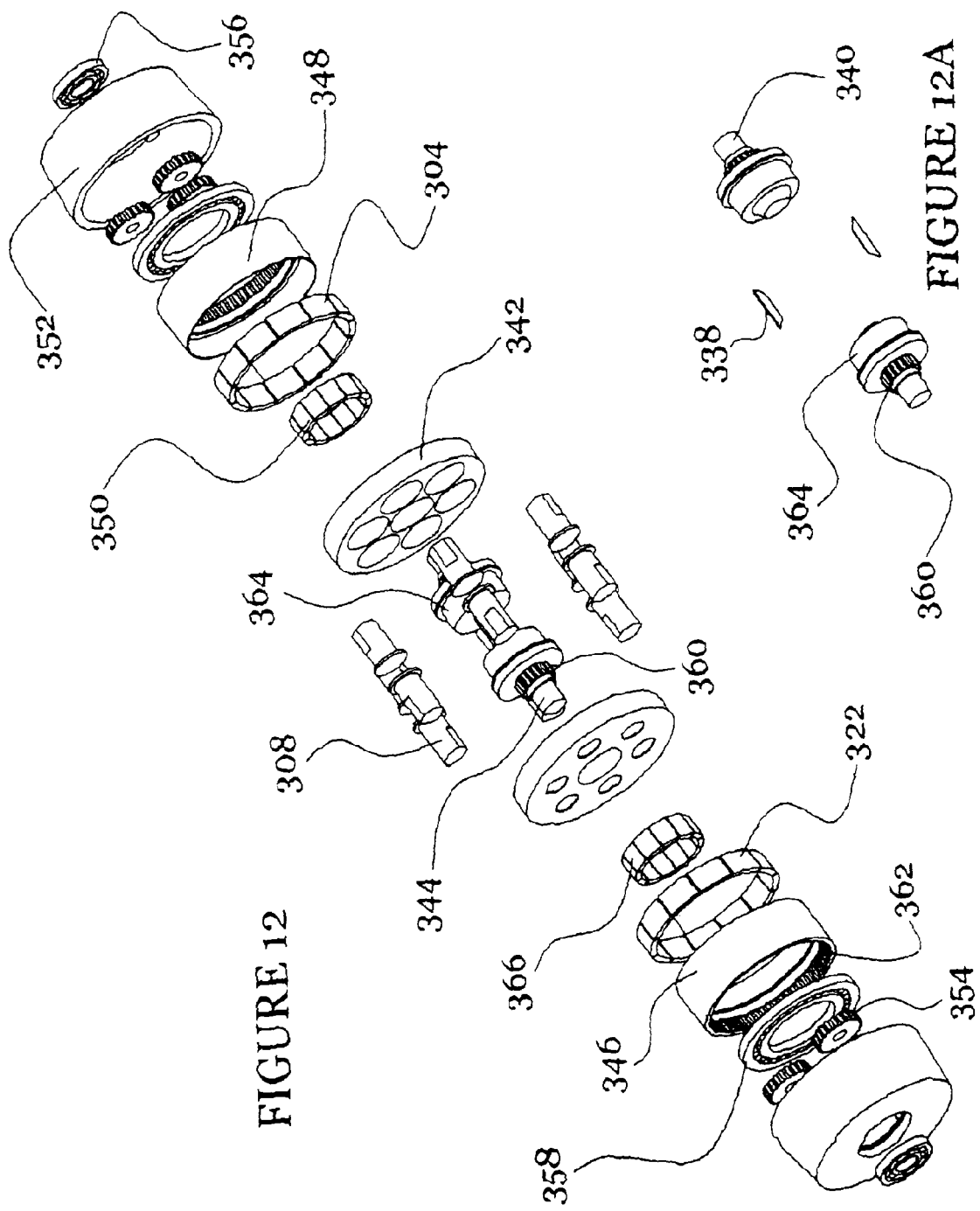
FIG. 12 is an exploded view of the third embodiment of the invention.
FIG. 12a is a partial exploded view of gearing arrangements which provide counter-rotation between different ends of the axle.

FIG. 11 is a cross sectional view of a third embodiment of the invention with counter-rotation of the cans and with multiple electromagnets, while FIG. 12 is an exploded view of the third embodiment of the invention. In these and similar designs (such as FIG. 3) the electromagnets terminate at a first chassis, with another electromagnet projecting in the opposite direction from a second chassis. The two can portions 346/348 then counter-rotate. Advantages of this structure include balancing of gyroscopic forces and a dramatic reduction of vibration. Normal electrical motors tend to vibrate violently, and exert considerable gyroscopic forces onto their mountings.

First magnet ring 304 and second magnet ring 322 are mounted in respective can parts 348 and 346, however, it may be seen that these body parts are geared in order to move the field magnet rings in a direction opposite to one another, with the six electromagnets 308 in between. Two chassis portions 342 are used to provide for the securing of the electromagnet chassis electromagnets 308. When the two chassis portions 342 are placed face to face, they leave a cavity for each electromagnet. The cavity has sufficient space for electromagnet bodies with the windings (which thicken the diameter of the electromagnets 308 considerably around the middle section). The cavity has smaller apertures which pass from the cavity to the distal (non-facing) sides of the two chassis portions, and it is through these smaller apertures that the ends and projections of the electromagnets pass to project toward the field magnets. Shaft and gear assembly 344 is geared (shaft gear 360) to engage to a ratio gear 354 and thus in turn drive can gear 362 and thus cause rotation of first can portion 346 and second can portion 348. Note that the shaft mounted inner ring of field magnets 366/350 is actually mounted to the shaft at an inner field magnet mounting 364 of the shaft body, that is, these magnets are not mounted on the cans but on to a shaft body, which in turn requires the use of the ratio gear 354 or the like to provide the proper relative speeds of motion. In fact, due to the action of the ratio gears 354, the inner and outer rings of spinning field magnets are moving in opposite directions, again implicating the direction of the magnetic fields in relation to one another.

Since the cans are moving the ratio gears may benefit from a stable pin to hold them in place, it is useful for both safety and mounting reasons to provide some sort of cover 352, and by means of bearings 356 the electromagnet chassis 342 may be motionless. Bearing 358 allows the can portion 346 and field magnets 322 to spin in a first direction while the shaft mounted inner ring of field magnets 366 spin in the opposite direction under the drive of gear 354.

Shaft gear 360 may be seen to be depicted as a shoulder on the shaft, but in fact it may be located at other locations along the shaft, as may the gear to which it engages, ratio gear 354.

FIG. 12a is a partial exploded view of the gearing arrangements which provide counter-rotation between opposite ends of the axle. Counter-rotation gear 338 provides for rotation of the different parts of a split axle 340 (similar to the one seen in FIG. 2) in two different directions of rotation. By this means, the opposite ends of the shaft may rotate in opposite directions, thus maintaining opposing rotations of axle versus can and thus the stationary chassis magnets versus the rotating field magnets.

Note that in embodiments the flux ring may be a different unit from the can or body, for example, to save weight by having non-magnetic lightweight can and a magnetic flux ring attached to the can.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. An electrical generator and/or motor comprising:
   a can;
      an axle extending into the can, the axle defining axial and radial directions within the generator and/or motor, the axle having thereon an electromagnet chassis extending radially from a medial portion of the axle, the chassis and axle rotatable independently relative to each other;
      a plurality of electromagnets attached to the electromagnet chassis in a radial array, each electromagnet having an elongated body disposed parallel to the axle, each electromagnet body having at least one end extending axially from the electromagnet chassis;
      each electromagnet body having a winding portion and at least one winding disposed about the winding portion;
      each electromagnet further having at least one projection portion extending axially out beyond each end of the electromagnet body, each projection portion having at least one air gap surface oriented axially, with at least two opposing air gap surfaces at each end of the electromagnet body;
      a plurality of rings of magnets disposed radially about the shaft in electromagnetic communication with each air gap surface, each ring of magnets disposed in a position selected from radially outward from the projection portion of the electromagnet and radially inward from the projection portion of the electromagnet;
      each of the rings of magnets further disposed axially from the winding portion of each electromagnet.

2. The electrical generator and/or motor of claim 1, wherein:
   each electromagnet has two ends extending axially in opposite directions from the chassis;
   each electromagnet has two projections at each end; and
   the device has four rings of magnets.

3. The electrical generator and/or motor of claim 1, wherein:
   each electromagnet has two ends extending axially in opposite directions from the chassis;
   each electromagnet has four projections at each end; and
   the device has eight rings of magnets.

4. The electrical generator and/or motor of claim 1, further comprising:
   first and second can parts disposed about the axle, facing and opposed to each other, each can part having a facing interior side, each facing interior side having at least one ring of magnets attached thereto.

5. The electrical generator and/or motor of claim 3, wherein the windings are disposed upon the winding portions of the electromagnet bodies with the windings partially located in between the projections, in a plane substantially parallel to the axis.

6. The electrical generator and/or motor of claim 1, wherein the windings are disposed upon the winding portions of the electromagnet bodies with the windings co-axial with the axis.

7. The electrical generator and/or motor of claim 2, further comprising: means for allowing counter-rotation of the two can parts.

8. The electrical generator and/or motor of claim 7, wherein the means for allowing counter-rotation of the two can parts further comprises:
   bearings disposed upon the axle and at least one of the two can parts.

9. The electrical generator and/or motor of claim 7, wherein the means for allowing counter-rotation of the two can parts further comprises:
   a first can part disposed about the axle but not directly attached thereto, and gearing causing the first can part to counter-rotate in relationship to the second can part.

10. The electrical generator and/or motor of claim 1, wherein:
    there are at least three electromagnets.

11. An electrical generator and/or motor comprising:
    a can, an axle, the axle having disposed thereon an electromagnet chassis having disposed thereon a plurality of elongated electromagnets, the chassis and can not co-rotating, the electromagnets having one or two ends extending axially from the electromagnet chassis in opposite directions, each end having at least one projection extending further axially and free of windings into an air gap defined by at least two rings of field magnets at each end of the electromagnets.

12. The electrical generator and/or motor of claim 11, wherein:
    each electromagnet has two projections at each end; and
    the generator and/or motor has four rings of field magnets.

13. The electrical generator and/or motor of claim 11, wherein:
    each electromagnet has four projections at each end; and
    the device has eight rings of field magnets.

14. The electrical generator and/or motor of claim 11, further comprising:
    first and second cans disposed about the axle facing and opposed to each other,
    each can having a facing interior side, each facing interior side having at least one ring of field magnets attached thereto.

15. The electrical generator and/or motor of claim 12, wherein electromagnet windings are disposed upon the electromagnets with the windings partially located in between the projections, in a plane substantially parallel to the axis.

16. The electrical generator and/or motor of claim 12, wherein electromagnet windings are disposed upon the electromagnets with the windings co-axial with the axis.

17. The electrical generator and/or motor of claim 14, further comprising means for allowing counter-rotation of the two cans.

18. The electrical generator and/or motor of claim 17, wherein the means for allowing counter-rotation of the two cans further comprises:
    bearings disposed upon the axle and at least one of the two cans;
    a first can disposed about the axle but not directly attached thereto; and
    gearing causing the first can to counter-rotate in relationship to the second can.

19. The electrical generator and/or motor of claim 11, wherein:
    there are at least three electromagnets.

20. The electrical generator and/or motor of claim 11, wherein:
    the motion of the parts of the electrical generator and/or motor device is one member selected from the group consisting of:
    a can rotating and the electromagnet chassis not rotating, a can not rotating and the electromagnet chassis rotating, and a can and electromagnet chassis counter-rotating.

* * * * *